(No Model.)
J. D. FOSTER.
MEAT TENDERER.
No. 338,258. Patented Mar. 23, 1886.
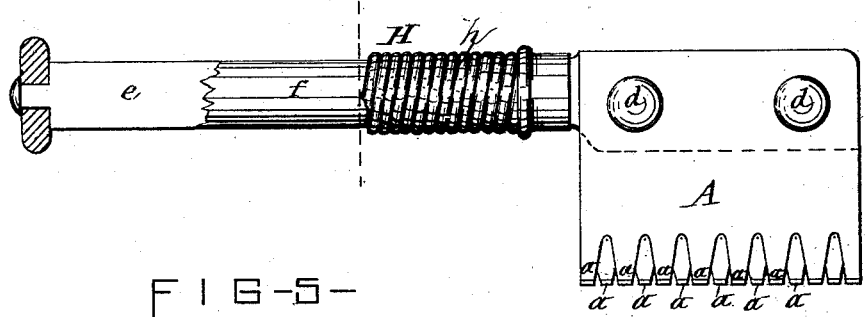
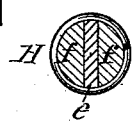
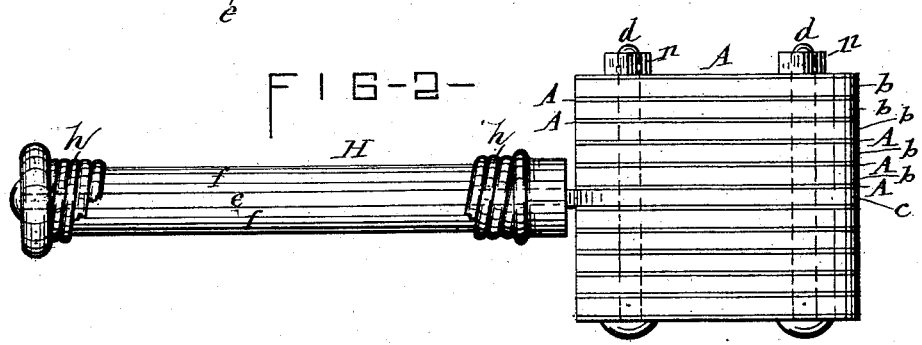
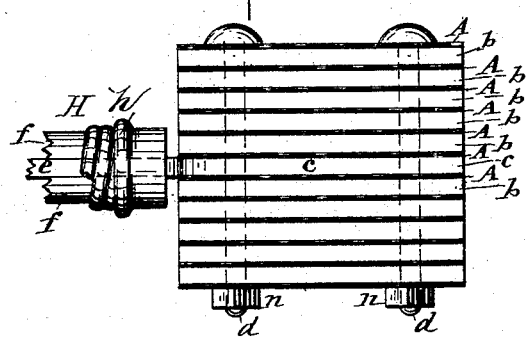
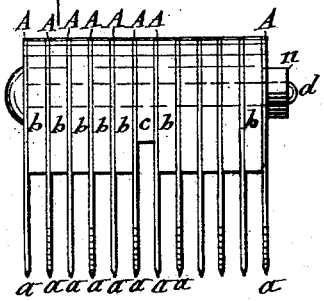
ATTEST—
Wm. C. Raymond
Chr. Bendixon
INVENTOR—
John D. Foster
per Duell, Lassat &
his Atty.

UNITED STATES PATENT OFFICE.

JOHN D. FOSTER, OF FULTON, NEW YORK.

MEAT-TENDERER.

SPECIFICATION forming part of Letters Patent No. 338,258, dated March 23, 1886.

Application filed September 24, 1885. Serial No. 178,022. (No model.)

*To all whom it may concern:*

Be it known that I, JOHN D. FOSTER, of Fulton, in the county of Oswego, in the State of New York, have invented new and useful Improvements in Meat-Tenderers, of which the following, taken in connection with the accompanying drawings, is a full, clear, and exact description.

This invention consists in a novel construction of a meat-tendering implement which is efficient in its operation, simple and comparatively inexpensive to manufacture, and capable of being taken apart for repairs or renewal of its component parts, all as hereinafter more fully described, and specifically set forth in the claim.

In the annexed drawings, Figure 1 is a side view of my invention, parts of the handle being broken away to illustrate the construction of said handle. Fig. 2 is a top plan view of the implement. Fig. 3 is an inverted plan view. Fig. 4 is an end view of the same; and Fig. 5 is a transverse section of the handle.

Similar letters of reference indicate corresponding parts.

A A represent a series of steel plates held parallel and proper distances apart by spreading-plates $b\ b$, interposed between the plates A A, and all of said plates are provided with coinciding bolt-holes, and by means of bolts $d\ d$, passing transversely through them and provided with nuts $n\ n$, said plates are securely clamped together. The nuts being removable allows the plates to be separated from each other, when required, for repairs or removal.

The steel plates A A are each provided with a series of cutting-edges, $a\ a$, which are formed by intervening V-shaped excisions, and thus have inclined end edges, which serve to clear the plate from the meat and prevent the implement from clogging. Each of said plates has its cutting-edges intermediate those of the adjacent plate, so as to insure a more thorough hacking or laceration of the meat without completely separating the particles.

H denotes the handle of the implement. It is formed of a metal tang, $e$, terminating in a shank, $c$, which passes between two of the cutting-plates A A, and is provided with bolt-holes, through which the clamping-bolts $d\ d$ pass.

Upon the sides of the tang $e$, I place wooden cheek-pieces $f\ f$, to impart the desired form to the handle, and over the cheek-pieces and inclosed tang I wind rattan or cord or other suitable material, $h$, as illustrated in Fig. 1 of the drawings.

Having described my invention, what I claim as new, and desire to secure by Letters Patent, is—

The combination of the plates A A, provided with a series of cutting-edges, $a\ a$, spreading-plates $b\ b$, and the handle-shank $c$, interposed between the plates A A, and the clamping-bolts $d\ d$, passing transversely through the plates A $b$ and shank $c$, and provided with removable nuts $n\ n$, substantially as described and shown.

In testimony whereof I have hereunto signed my name and affixed my seal, in the presence of two attesting witnesses, at Fulton, in the county of Oswego and State of New York, this 10th day of September, 1885.

JOHN D. FOSTER. [L. S.]

Witnesses:
 JNO. M. FOSTER,
 LANG. C. FOSTER.